United States Patent Office
3,449,329
Patented June 10, 1969

3,449,329
POLYAZLACTONES
Bernard S. Wildi, St. Louis, Mo., assignor to Monsanto Chemical Company, St. Louis, Mo., a corporation of Delaware
No Drawing. Filed July 8, 1963, Ser. No. 293,287
Int. Cl. C07d 85/42; C08g 33/02
U.S. Cl. 260—240                                    8 Claims This invention relates to polyazlactones as new compositions of matter. This invention further relates to a novel process for preparing polyazlactones which comprises reacting a bis-N-carbonyl glycine with a bis-aldehyde or bis-ketone in the presence of a basic enolizing and condensing medium.

It is an object of this invention to provide polyazlactones as new compositions of matter.

It is another object of this invention to provide a process for the preparation of polyazlactones.

Additional objects, benefits, and advantages will become apparent as the detailed description of the invention proceeds.

Azlactones of the formula

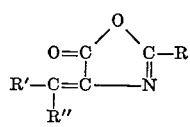

are well known in the art as intermediates useful in the preparation of various organic compounds. It has now been discovered that polyazlactones of the formula

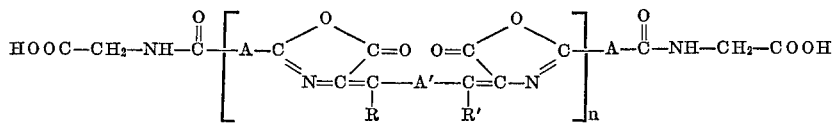

where A and A' are bivalent organic radicals containing from two to twenty carbon atoms which provide conjugated unsaturation through the polymer chain; where R and R' are hydrogen radicals or alkyl radicals containing up to four carbon atoms; and where n is an integer from 1 to 50 or more, can be prepared possessing electrical properties useful in the semiconductor range.

The polyazlactone polymer chains need not be terminated solely by glycine radicals as depicted in the above general formula. Rather the polymer chains can also be terminated by the substituted carbonyl groups of the

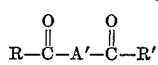

reactant. Variation of terminal radicals produces compostions of the following structure

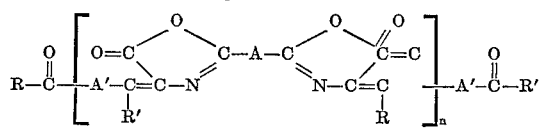

and

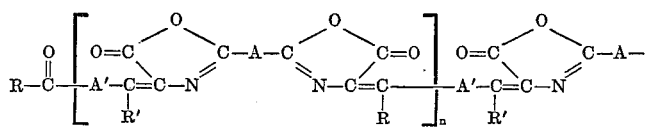

The A and A' radicals of the above formulas can contain from two to twenty, and preferably from two to six, carbon atoms. Examples of A and A' include bivalent radicals of benzene, pyridine, pyridazine, pyrimidine, pyrazine, victriazine, as-triazine, vic-tetrazine, and s-tetrazine; isomeric forms of oxazines, isoxazines, pyrones, and pyrans; 1,3,2-dioxazole, 1,2,3-dioxazole, 1,2,3-oxadiazole, oxazole, isoxazole, 1,2,3-triazole, 4,1,2-triazole, imidazole, pyrazole, pyrrole, isopyrrole, and furan; and thio derivatives of the above oxygen-containing heterocyclic rings. The radicals A and A' are not limited to monoaromatic nuclei but may also consist of divalent polyaromatic radicals and of divalent polyolefinic radicals with the unsaturation arranged so as to provide conjugated unsaturation through the polymer chain. Examples of such polyaromatic and polylefinic compounds include bivalent radicals of naphthalene, biphenyl, chrysene, ethylene, 1,3-butadiene, isoprene, 1,3-pentadiene, 1,3-hexadiene, and 2,4-hexadiene. In addition, bivalent radicals of the above compounds can have a wide variety of substituents attached thereto and still be suitable for use in this invention. Examples of such substituents include hydroxyl, halogen, alkyl, alkoxy, acyloxy, carbethoxy, nitro, and combinations of two or more of these radicals. Bivalent radicals of compounds containing some of these substituents are phenol, hydroquinone, resorcinol, catechol, chlorobenzene, toluene, xylenes, dimethoxybenzenes, methyl benzoate, 2,3-dichloro-1,3-butadiene, and many others.

In order to obtain polyazlactones having semiconductive properties, it is necessary that the bivalent radicals A and A' be linked into the polymer chain at positions on the radicals which will provide a system of conjugated double bonding through the polymer chain. This is accomplished by attachment of carbonyl groups to carbon atoms in the aromatic ring or olefinic chain in such a manner that the carbonyl groups are separated by an even number of atoms and in such a manner that the carbonyl groups are linked together by alternating double and single bonds. Using the bivalent radical of 1,3-pentadiene as an example, 1,4-diformyl-1,3-pentadiene when polymerized according to the method described herein, provides the requisite conjugated system

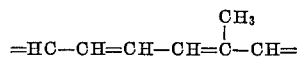

Conversely, the compound 1,5-diformyl-1,3-pentadiene when polmerized with appropriate coreactants does not provide a conjugated system

and hence is unsuitable for use in the preparation of the polyazlactones of this invention. Consequently, when A is a disubstituted benzene, the phenylene group must contain the polymerizable substituents in an ortho or para position to each other. The same is true of the six-membered aromatic hetero-cyclic rings such as pyridine, pyrazines, triazines, pyrans, pyrones, and oxazines. It should be noted that s-triazine was not included in the list of

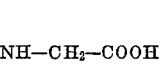

compounds which furnish suitable bivalent radicals; this is because s-triazine cannot contain two polymerizable groups substituted in positions ortho or para to each other and hence is not an aromatic compound suitable for incorporation into the polymers of this invention. The requirement set forth regarding conjugated linkages is likewise applicable to five-membered organic ring compounds. As an example, imidazole

when substituted in the 2 and 5 position or in the 4 and 5 position provides a radical suitable for incorporation into the present polyazlactones; substitution in the 2 and 4 position would provide an unsuitable radical since either an odd number of atoms (atoms in the 2, 3, and 4 position) are located between the two external substituents, or the atoms of the ring between the two external substituents are not connected through a conjugated linkage (atoms in the 2, 1, 5 and 4 position).

The R groups in the polyazlactone formulas are preferably hydrogen but can also be alkyl radicals containing up to four carbon atoms, examples being methyl, ethyl, n-propyl, isopropyl, n-butyl, isobutyl, and tert-butyl radicals.

The integer $n$ in the polyazlactone formulas can vary from as low as one up to fifty or more, thereby including compounds with a molecular weight of from around 400 up to several thousand.

Polyazlactones are prepared by reacting a bis-N-carbonyl glycine with a bis-aldehyde or bis-ketone in a basic enolizing and condensing medium. The polymerization proceeds as follows:

$$HOOC-CH_2-NH-\overset{O}{\underset{\|}{C}}-A-\overset{O}{\underset{\|}{C}}-NH-CH_2-COOH + R-\overset{O}{\underset{\|}{C}}-A'-\overset{O}{\underset{\|}{C}}-R' \longrightarrow$$

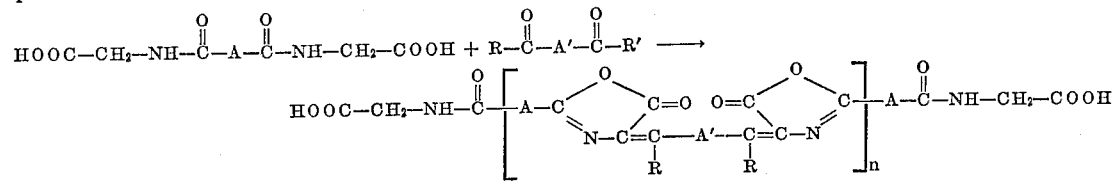

Bis-N-carbonylglycines suitable for use in the polymerization described above are compounds of the general formula $$HOOC-CH_2-NH-\overset{O}{\underset{\|}{C}}-A-\overset{O}{\underset{\|}{C}}-NH-CH_2-COOH$$

where A is a bivalent organic radical such as those previously named in the description of the polyazlactone constituents. Examples of suitable aromatic glycines include: benzene-1,4-N,N'-dicarbonylglycine; pyridine-2,5-N,N' - dicarbonylglycine; pyridazine-4,5-N,N'-dicarbonylglycine; v-triazine-3,6-N,N'-dicarbonylglycine; s-tetrazine-3,6 - N,N' - dicarbonylglycine; 1,2,6-oxazine-4,5-N,N'-dicarbonylglycine; o - isoxazine-3,6-N,N'-dicarbonylglycine; 1,2 - pyrone - 3,6-N,N'-dicarbonylglycine; 1,4-pyran-2,3-N,N' - dicarbonylglycine; 1,2,3-dioxazole-4,5-N,N'-dicarbonylglycine; 1,2,3 - oxadiazole - 4,5 - N,N' - dicarbonylglycine; oxazole-2,5-N,N'-dicarbonyl glycine; isoxazole-4,5-N,N' - dicarbonylglycine; 4,1,2 - triazole-3,5-N,N'-dicarbonylglycine; imidazole - 2,5-N,N'-dicarbonylglycine; pyrazole - 4,5-N,N'-dicarbonylglycine; pyrrole-2,5-N,N'-dicarbonylglycine; furan - 4,5- N,N'-dicarbonylglycine; and thio derivatives of the above oxygen-containing heterocyclic compounds. Suitable aliphatic glycines include: fumaroyl-N,N'-diglycine; 1,3-butadiene-1,4-N,N'-dicarbonylglycine; 1,3 - pentadiene-1,4-N,N'-dicarbonylglycine; and 2,4 - hexadiene-2,5-N,N'-dicarbonylglycine. In addition to glycines containing non-polymerizable substituents such as halogen and alkyl groups on the bivalent radical, the rules previously set forth regarding relative placement of polymerizable substituents on the aromatic ring and olefinic chain permit the use of numerous isomers of the above named compounds, examples being benzene-1,2-N,N'-dicarbonylglycine; pyridine - 2,3-N,N'-dicarbonylglycine; pyridine-3,6-N,N'-dicarbonylglycine; 1,2 - pyrone-3,4-N,N'-dicarbonylglycine; 1,2-pyrone-5,6-N,N'-dicarbonylglycine; pyrrole-2,3-N,N'-dicarbonylglycine; pyyrole - 4,5-N,N'-dicarbonylglycine; 2,4-hexadiene-2,3-N,N'-dicarbonylglycine; and 1,3-buta- diene-1,2-N,N'-dicarbonylglycine. Particularly preferred glycines for use in this invention are benzene-1,4-N,N'-dicarbonylglycine and 1,3-butadiene-1,4-N,N'-dicarbonylglycine.

Bis-aldehydes and bis-ketones suitable for use in the polymerization are compounds of the general formula

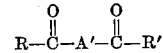

where A' is a bivalent organic radical such as those named in the description of the polyazlactone constituents and R and R' are hydrogen radicals or alkyl radicals containing up to four carbon atoms. The A' radical of the above compound is coextensive in all respects with the A radical of the aforementioned diglycines and is likewise subject to the same restrictions. Examples of such aldehydes and ketones include: o-phthalaldehyde; terephthalaldehyde; 1,4-diacetyl benzene; 2,5-diformyl pyridine; 2,3-dipropionyl pyridine; 3,6-dibutyryl pyridazine; 3,6-divaleryl-vic-trazine; 3,6-diformyl-s-tetrazine; 4,5-diformyl-1,2,6-oxazine; 3,4-diacetyl-o-isoxazine; 2,3-diformyl-1,4-pyrone; 3,6-diacetyl-1,2-pyran; 4,5-dipropionyl-1,2,3-dioxazole; 4,5-dibutyryl-1,2,3-oxadiazole; 4,5-divaleryl oxazole; 4,5-diformyl isoxazole; 3,5-diformyl-4,1,2-triazole; 4,5-diacetyl imidazole; 4,5-diformyl pyrazole; 2,3-diacetyl pyrrole; 2,5-diformyl furan; thio derivatives of the above oxygen-containing heterocyclic compounds, substituted hydroxyl, halogen, alkyl, alkoxy, acyl, acyloxy, carbethoxy, and nitro compounds; and numerous position isomers of the above compounds which provide the necessary conjugated linkage when polymerized. A particularly preferred compound which has been found useful is terephthalaldehyde.

The polymerization is conducted in a basic enolizing and condensing medium. A condensing medium satisfactory for use in the present inventive process is one which promotes condensation of the bis-carbonyl glycine and the bis-aldehyde or ketone. Examples of compounds useful for this purpose include organic acids and anhydrides such as acetic acid, p-toluene-sulfonic acid, and phthalic anhydride; and inorganic mineral acids such as sulfuric and hydrochloric acids. A preferred condensing medium is acetic anhydride. Examples of suitable basic enolizing mediums are the inorganic bases such as oxides or hydroxides of the alkali metals and alkali earth metals and basic salts such as trisodium phosphate, potassium carbonate, and disodium succinate. A preferred base useful with acetic anhydride is sodium acetate.

With certain combinations of enolizing compounds and condensing mediums it is necessary to form the polyazlactone by a two step process to prevent neutralization of the enolizing compound by the condensing medium. Such is the case when a sodium hydroxide-sulfuric acid enolizing-condensing medium is employed. Selection of a system such as a sodium acetate-acetic anhydride system permits the polymerization of the reactants in one step, thereby obviating the necessity of a separate preparation of the glycine enol prior to polymerization. Other combinations which provide a medium suitable for a one step polymerization of the reactants described above include sodium benzoate-benzoic acid, and potassium succinate-succinic acid systems.

Polymerization times and temperatures may vary depending upon the particular polyazlactone being prepared. In general I have found that temperature required to maintain the reaction mixture at a gentle reflux is satisfactory. This is usually accomplished by heating a reaction mixture to about 130° C. to 250° C. Times required for maximum polymerization can vary from six minutes or less to ten hours or more, preferably from fifteen minutes to about two hours.

In a preferred method of polymerization a bis-carbonyl glycine, a bis-aldehyde or ketone, acetic anhydride, and sodium acetate are mixed together and refluxed gently for as short a time as necessary to give a maximum yield of the polyazlactone. Proportions of the bis-glycine and bis-aldehyde or ketone in the reactant mixture are not critical since the reactants will condense in a substantially 1:1 molar ratio regardless of the proportions of the reactants. Preferably, the reactants are added in a substantially 1:1 molar ratio however, in order to utilize both the monomeric glycine and aldehyde or ketone most efficiently. This reaction time as explained above varies depending upon the reactants and can be determined empirically. The mixture is then cooled and filtered to remove the precipitated polymer.

The invention will be more clearly understood from the detailed description set forth in the following specific examples.

EXAMPLE 1

Benzene-1,4-N,N'-dicarbonylglycine was prepared as follows: 20 grams of glycine was dissolved in a minimum of water and cooled to 0° C. To the glycine solution was added 30 grams of terephthaloyl dichloride dissolved in about 650 ml. of dry, cold ether. Several drops of phenolphthalein were added and the solution stirred as pink color was acquired, the addition of sodium hydroxide was stopped and the solution re-acidified to pH 2 with 6 N hydrochloric acid. The solid bis-glycine was thereby precipitated as colorless crystals. Recrystallization of the glycine from two liters of water containing 200 ml. of concentrated hydrochloric acid yielded 36.8 grams of benzene-1,4-N,N'-dicarbonylglycine. Melting point of the product was 257–262° C. with decomposition.

Analysis for $C_{12}H_{12}N_2O_6 \cdot 2H_2O$ was calculated as: C, 45.57%; H, 5.09%; N, 8.85%. Found C, 45.80, 46.01%; H, 5.51, 5.81%; N, 8.56, 8.74%.

A quantity of 10 grams of benzene-1,4-N,N'-dicarbonyl glycine, 6 grams of terephthalaldehyde, 400 ml. of acetic anhydride, and 3 grams of freshly fused sodium acetate were mixed together and heated to a gentle reflux for 6 hours. The mixture was cooled, filtered, and the polymerized product, a brick red filter cake, was washed successively with acetic acid and methanol. Product yield was 6.5 grams. Following washing with hot water and recrystallization from hot methanol, analysis of the product was C, 65.80, 66.06%; H, 3.90, 3.74%; N, 5.88, 5.82%.

The following procedure describes the determination of electrical properties of the polyazlactones. The material was tested in powdered form as follows: the test cell for the electrical measurement was a tubular quartz cylinder with a ¾ inch internal diameter. This cylinder was placed upright on a platinum plate, thereby sealing off the bottom of the cylinder. The powdered sample to be tested was added to the quartz cylinder to a depth of one or two millimeters. A platinum slug was inserted at the cold 2 N sodium hydroxide was added. When a permanent top of the quartz cylinder and a pressure of 900 grams/sq. cm. was applied to the powdered sample through the slug. The sample was heated by conduction through the platinum plate to a temperature of 280° C. under a vacuum of about $10^{-3}$ mm. of mercury for at least 16 hours. Following this treatment, the sample was subjected to a series of treatments, involving evacuation under high vacuum, purging with nitrogen, evacuation under high vacuum, and finally subjection to a nitrogen atmosphere of 5 inches of Hg absolute pressure in preparation for the electrical testing. During the electrical testing, the pressure of 900 grams/sq. cm. was maintained on the powdered sample described above. As previously indicated, the heating of the samples was accomplished by conduction through the platinum plate upon which the quartz cylinder and the powdered sample rests. Resistivity measurements were made beginning at the high temperature with successive measurements being made as the sample cooled down. These measurements were made across the thickness of the sample via the platinum plate and the platinum slug and were plotted as the logarithm of the resistivity versus the reciprocal of the absolute temperature in degrees Kelvin times 1000. From this curve, $\Delta E$, the transition energy, and $\rho_0$, the resistivity extrapolated to 1000/K=0, were obtained. The following figures are data obtained on the polyazlactone prepared according to this example.

$\rho 25°$ ohm-cm. _____ $4.8 \times 10^8$
$\rho 227°$ C. ohm-cm. _____ $2.2 \times 10^8$
$\rho 300°$ C. ohm-cm. _____ $6.5 \times 10^7$
$\rho_0$ ohm-cm. _____ $8.5 \times 10^3$
$\Delta E$ (e.v.) _____ .33

Inspection of the data presented shows that the compounds of this invention possess semiconductive properties which make them useful as components in such devices as diodes, power rectifiers, transistors, thermistors, etc.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. Accordingly, modifications are contemplated which can be made without departing from the spirit of the described invention.

What is claimed is:

1. A compound of the general formula

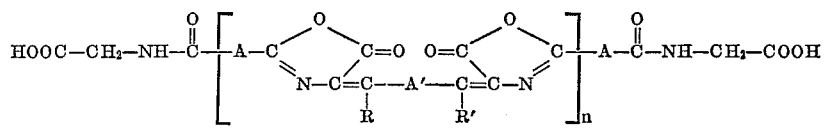

where A and A' are bivalent aromatic or olefinic radicals containing from two to twenty carbon atoms which provide conjugated unsaturation through the polymer chain; where R and R' are selected from the group consisting of hydrogen radicals and alkyl radicals containing up to four carbon atoms; and where $n$ is an integer from one to about fifty.

2. A compound according to claim 1 wherein A and A' are bivalent aromatic radicals and where R and R' are hydrogen radicals.

3. A compound according to claim 2 wherein A and A' are selected from the group consisting of O-phenylene and p-phenylene radicals.

4. A compound according to claim 1 wherein A and A' are bivalent olefinic radicals and R and R' are hydrogen radicals.

5. A compound of the formula

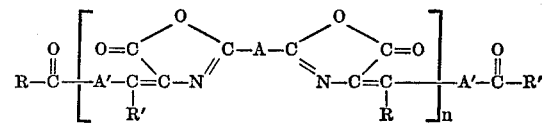

where A and A' are bivalent aromatic or olefinic radicals containing from two to twenty carbon atoms which provide conjugated unsaturation through the polymer chain; where R and R' are selected from the group consisting of hydrogen radicals and alkyl radicals containing up to four carbon atoms; and where $n$ is an integer from one to about fifty.

6. A compound of the formula

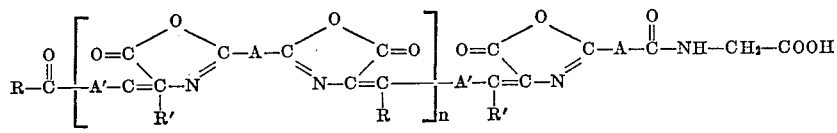

where A and A' are bivalent aromatic or olefinic radicals containing from two to twenty carbon atoms which provide conjugated unsaturation through the polymer chain; where R and R' are selected from the group consisting of hydrogen radicals and alkyl radicals containing up to four carbon atoms; and where $n$ is an integer from one to about fifty.

7. A compound of the formula

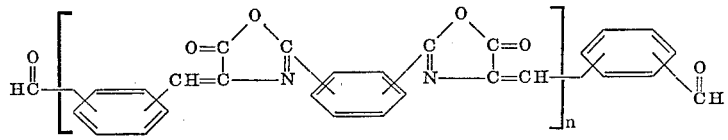

where $n$ is an integer from one to about 50.

8. A compound of the formula

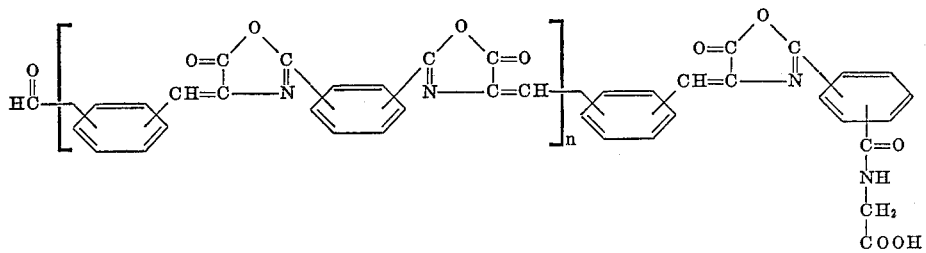

where $n$ is an integer from one to about 50.

References Cited

Cleaver et al.: J. Am. Chem. Soc. vol. 77, pages 1541 to 1546 (1955) QD1A5.

Robinson et al.: J. Chem. Soc. 1931, pages 3173 to 3176 QD1C6.

Ruggli et al.: Helv. Chim. Acta. vol. 23, pages 718 to 721 (1940) QD1H4.

Chemicals Abstract: vol. 53, col. 21885 (1959) QD1 A51 (abstract of Frunze et al.).

JOHN D. RANDOLPH, *Primary Examiner.*

U.S Cl. X.R.

252—62.3; 260—240.1, 244, 248, 250, 251, 309, 307, 308, 310, 347.3, 345.7, 534, 544; 317—237

PO-1050
(5/69)

UNITED STATES PATENT OFFICE
CERTIFICATE OF CORRECTION

Patent No. 3,449,329      Dated June 10, 1969

Inventor(s) Bernard S. Wildi

It is certified that error appears in the above-identified patent and that said Letters Patent are hereby corrected as shown below:

Column 1, line 35, that portion of the formula reading

Column 1, line 56, that portion of the formula reading

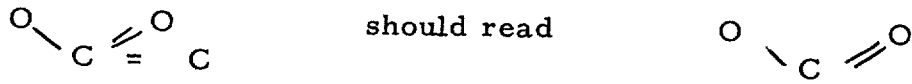

Column 1, line 65, that portion of the formula reading

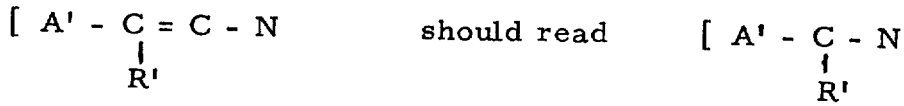

Column 4, line 21, "-vic-trazine" should read-- -vic-triazine--. Column 5, line 31, "pink color was acquired, the addition of sodium hy-" should read -- cold 2N sodium hydroxide was added. When a permanent pink color was acquired, the addition of sodium hy- --. Column 5, line 70, "cold 2N sodium hydroxide was added. When a permanent" should be deleted. Column 6, line 64, "O-phenyl-" should be --o-phenyl- --.

SIGNED AND
SEALED
MAR 17 1970

(SEAL)
Attest:

Edward M. Fletcher, Jr.
Attesting Officer

WILLIAM E. SCHUYLER, JR.
Commissioner of Patents